United States Patent
Sardariani et al.

(10) Patent No.: US 9,317,798 B2
(45) Date of Patent: Apr. 19, 2016

(54) INVERTED F ANTENNA SYSTEM AND RFID DEVICE HAVING SAME

(75) Inventors: Edmond Sardariani, San Jose, CA (US); Thomas Birnbaum, Santa Cruz, CA (US); Debalina Ghosh, Santa Clara, CA (US); Sireesha Ramisetti, Sunnyvale, CA (US)

(73) Assignee: Intelleflex Corporation, San Jose, CA (US)

( * ) Notice: Subject to any disclaimer, the term of this patent is extended or adjusted under 35 U.S.C. 154(b) by 504 days.

(21) Appl. No.: 13/532,694

(22) Filed: Jun. 25, 2012

(65) Prior Publication Data

US 2012/0268327 A1  Oct. 25, 2012

Related U.S. Application Data

(63) Continuation-in-part of application No. 11/847,152, filed on Aug. 29, 2007, now Pat. No. 8,228,236.

(51) Int. Cl.
*H01Q 1/38* (2006.01)
*H01Q 1/22* (2006.01)
*G06K 19/077* (2006.01)
*H01Q 9/04* (2006.01)
*H01Q 9/14* (2006.01)
*H01Q 23/00* (2006.01)

(52) U.S. Cl.
CPC ........ *G06K 19/07749* (2013.01); *H01Q 1/2208* (2013.01); *H01Q 9/0421* (2013.01); *H01Q 9/145* (2013.01); *H01Q 23/00* (2013.01); *H01Q 1/38* (2013.01)

(58) Field of Classification Search
CPC ......... H01Q 1/38; H01Q 1/2208; H01Q 1/24; H01Q 1/28; H01Q 1/29; H01Q 1/30; H01Q 9/0421; H01Q 9/143; H01Q 23/00
USPC ........................................... 343/700 MS, 893
See application file for complete search history.

(56) References Cited

U.S. PATENT DOCUMENTS 5,835,063 A * 11/1998 Brachat .................. H01Q 1/243
                                              343/700 MS
5,995,048 A   11/1999 Smithgall et al.
(Continued)

OTHER PUBLICATIONS

Thaysen, Jesper and Kaj B. Jakobsen. Design considerations for low antenna correlation and mutual coupling reduction in mutl antenna terminals, European Transactions on Telecommunications 2007, vol. 18, pp. 319-326. Apr. 18, 2006.*

(Continued)

*Primary Examiner* — Dameon E Levi
*Assistant Examiner* — Jennifer F Hu
(74) *Attorney, Agent, or Firm* — Zilka-Kotab, PC

(57) ABSTRACT

An RFID device according to one embodiment includes an active portion of a first inverted F antenna; a feed electrically coupled to the active portion; an active portion of a second inverted F antenna, a feed electrically coupled to the second active portion; a ground plane spaced from the active portions; and an RFID controller coupled to the feeds. An RFID device according to another embodiment includes an inverted F antenna having an active portion, a ground plane spaced from the active portion, and a feed coupled to the active portion, wherein the active portion includes multiple aims, a first of the arms having a first length and a second of the arms having a second length; and an RFID controller coupled to the feed.

7 Claims, 9 Drawing Sheets

(56) References Cited

U.S. PATENT DOCUMENTS

| | | | |
|---|---|---|---|
| 6,075,707 A | 6/2000 | Ferguson et al. | |
| 6,118,379 A | 9/2000 | Kodukula et al. | |
| 6,278,369 B2 | 8/2001 | Smith et al. | |
| 6,339,400 B1 * | 1/2002 | Flint | H01Q 1/22 343/702 |
| 6,340,932 B1 | 1/2002 | Rodgers et al. | |
| 6,344,823 B1 | 2/2002 | Deng | |
| 7,058,434 B2 | 6/2006 | Wang et al. | |
| 7,183,976 B2 | 2/2007 | Wu et al. | |
| 7,183,994 B2 | 2/2007 | Weigand | |
| 7,250,867 B2 * | 7/2007 | Sakama | G06K 7/10178 235/492 |
| 7,408,512 B1 | 8/2008 | Rodenbeck et al. | |
| 7,411,554 B2 * | 8/2008 | Jung | H01Q 1/243 343/700 MS |
| 7,433,720 B2 | 10/2008 | Seol | |
| 7,477,196 B2 | 1/2009 | Asrani et al. | |
| 7,561,107 B2 * | 7/2009 | Al-Mahdawi | H01Q 25/005 235/492 |
| 7,671,815 B2 * | 3/2010 | Thornell-Pers | H01Q 1/243 343/702 |
| 8,228,236 B2 | 7/2012 | Birnbaum et al. | |
| 8,786,497 B2 * | 7/2014 | Sharawi | H01Q 1/38 343/700 MS |
| 2002/0075184 A1 * | 6/2002 | Tuttle | G06K 7/0008 343/700 MS |
| 2005/0195119 A1 * | 9/2005 | Gaucher | H01Q 9/0421 343/795 |
| 2005/0242964 A1 | 11/2005 | Tuttle | |
| 2006/0017628 A1 | 1/2006 | Wu et al. | |
| 2006/0033664 A1 | 2/2006 | Soler Castany et al. | |
| 2006/0109192 A1 | 5/2006 | Weigand | |
| 2006/0145927 A1 | 7/2006 | Choi et al. | |
| 2006/0256018 A1 | 11/2006 | Soler Castany et al. | |
| 2007/0001925 A1 | 1/2007 | Bae et al. | |
| 2007/0013589 A1 | 1/2007 | Park et al. | |
| 2007/0046543 A1 | 3/2007 | Choi et al. | |
| 2007/0052589 A1 * | 3/2007 | Liu | H01Q 1/38 343/700 MS |
| 2007/0096988 A1 | 5/2007 | Parsche et al. | |
| 2007/0103311 A1 | 5/2007 | Kippelen et al. | |
| 2007/0149146 A1 | 6/2007 | Hwang et al. | |
| 2007/0159399 A1 | 7/2007 | Perunka et al. | |
| 2007/0164868 A1 | 7/2007 | Deavours et al. | |
| 2007/0229279 A1 | 10/2007 | Yamazaki et al. | |
| 2008/0062044 A1 * | 3/2008 | Al-Mahdawi | H01Q 25/005 373/700 MS |
| 2008/0129632 A1 * | 6/2008 | Moon | H01Q 1/243 343/848 |
| 2009/0040109 A1 * | 2/2009 | Iguchi | H01Q 1/2283 343/700 MS |
| 2009/0058656 A1 | 3/2009 | Birnbaum et al. | |
| 2009/0128425 A1 * | 5/2009 | Kim | H01Q 1/243 343/702 |
| 2009/0224056 A1 * | 9/2009 | Kwon | G06K 19/07749 235/492 |
| 2010/0019908 A1 * | 1/2010 | Cho | G06K 19/07749 340/572.7 |
| 2011/0304512 A1 * | 12/2011 | Friederich | H01Q 1/243 343/702 |

OTHER PUBLICATIONS

Choi et al., "Platform-insensitive antenna for RFID sensor tag in the UHF band," Antennas and Propagation Society International Symposium, Jun. 9-15, 2007, IEEE, pp. 2277-2280.

International Search Report and Written Opinion from PCT Application No. PCT/US2008/10081 dated Nov. 13, 2008.

International Preliminary Report on Patentability from PCT Application No. PCT/US2008/010081 issued Mar. 2, 2010.

Choi et al., "An RFID Tag Using a Planar Inverted-F Antenna Capable of Being Stuck to Metallic Objects," ETRI Journal, vol. 28, No. 2, Apr. 2006, pp. 216-218.

Non-Final Office Action Summary from U.S. Appl. No. 11/847,152 dated Dec. 8, 2010.

Final Office Action Summary from U.S. Appl. No. 11/847,152 dated May 26, 2011.

Notice of Allowance and Fee(s) Due from U.S. Appl. No. 11/847,152 dated Mar. 20, 2012.

Birnbaum et al., U.S. Appl. No. 11/847,152, filed Aug. 29, 2007.

* cited by examiner

INVERTED F ANTENNA SYSTEM AND RFID DEVICE HAVING SAME

RELATED APPLICATIONS

This application is a continuation in part of copending U.S. patent application Ser. No. 11/847,152, filed Aug. 29, 2007, and which is herein incorporated by reference.

FIELD OF THE INVENTION

The present invention relates to inverted F Radio Frequency (RF) antennas, and more particularly, this invention relates to inverted F antennas and RFID devices.

BACKGROUND OF THE INVENTION

The use of RFID tags are quickly gaining popularity for use in the monitoring and tracking of an item. RFID technology allows a user to remotely store and retrieve data in connection with an item utilizing a small, unobtrusive tag. As an RFID tag operates in the radio frequency (RF) portion of the electromagnetic spectrum, an electromagnetic or electrostatic coupling can occur between an RFID tag affixed to an item and an RFID tag reader. This coupling is advantageous, as it precludes the need for a direct contact or line of sight connection between the tag and the reader.

Inverted F antennas have been used in wireless communications systems including mobile telephones, pagers, Global Positioning System (GPS), wireless LAN, WiFi, aircraft, locomotives, vehicles, radiolocation devices etc. Inverted-F antennas typically include a linear (i.e., straight) conductive element, e.g. a wire, that is maintained in spaced apart relationship with respect to a wound plane. They are especially useful where a low profile antenna is needed, one that does not stand tall above conummications device, or mobile platform.

However, inverted F antennas have rarely if ever been implemented in MD devices. This may be due to the standard configuration in which the feed line to the radiating element traverses the ground plane. Further, most inverted-F antennas are designed to match a 50 Ohm impedance, meaning that they will not function optimally if matched to an impedance that is not standard, e.g., 50 Ohms.

What is therefore needed is new design for inverted F antennas, as well as RFID devices implementing them.

SUMMARY OF THE INVENTION

An RFID device according to one embodiment includes an active portion of a first inverted F antenna; a feed electrically coupled to the active portion; an active portion of a second inverted F antenna, a feed electrically coupled to the second active portion; a ground plane spaced from the active portions; and an RFID controller coupled to the feeds.

An RFID device according to another embodiment includes an inverted F antenna having an active portion, a ground plane spaced from the active portion, and a feed coupled to the active portion, wherein the active portion includes multiple arms, a first of the arms having a first length and a second of the arms having a second length; and an RFID controller coupled to the feed.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1:
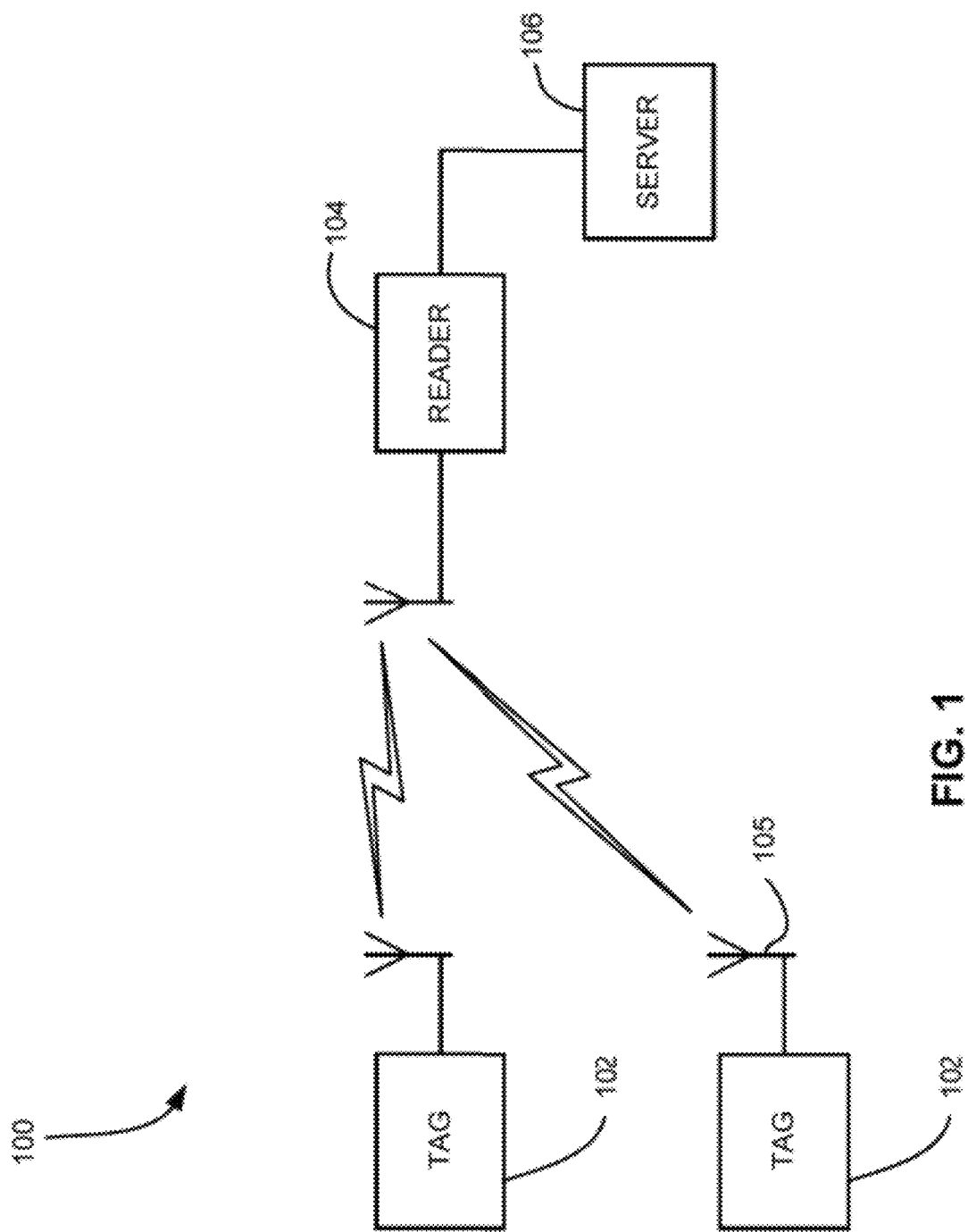
FIG. 1 is a system diagram of an RFID system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

In the drawings, like and equivalent elements are numbered the same throughout the various figures.

FIG. 1 depicts an RFID system 100 according to one of the various embodiments, which may include some or all of the following components and/or other components. As shown in FIG. 1, one or more RFID devices 102 are present. Each RFID device 102 in this embodiment includes a controller and memory, which are preferably embodied on a single chip as described below, but may also or alternatively include a different type of controller, such as an application specific integrated circuit (ASIC), processor, an external memory module, etc. For purposes of the present discussion, the RFID devices 102 will be described as including a chip. Each RFID device 102 may further include or be coupled to an antenna 105.

An illustrative chip is disclosed below, though actual implementations may vary depending on how the device is to be used. In general terms, a preferred chip includes one or more of a power supply circuit to extract and regulate power from the RF reader signal; a detector to decode signals from the reader; a backscatter modulator, a transmitter to send data back to the reader; anti-collision protocol circuits; and at least enough memory to store its unique identification code, e.g., Electronic Product Code (EPC).

While RFID devices 102 according to some embodiments are functional RFID tags, other types of RFID devices 102 include merely a controller with on-board memory, a controller and external memory, etc.

Each of the RFID devices 102 may be coupled to an object or item, such as an article of manufacture., a container, a device, a person, etc.

With continued reference to FIG. 1, a remote device 104 such as an interrogator or "reader" communicates with the RFID devices 102 via an air interface, preferably using standard RFID protocols. An "air interface" refers to any type of wireless communications mechanism, such as the radio-frequency signal between the RFID device and the remote device. The RFID device 102 executes the computer commands that the RFID device 102 receives from the reader 104.

The system 100 may also include an optional backend system such as a server 106, which may include databases containing information and/or instructions relating to RFID tags and/or tagged items.

As noted above, each RFID device 102 may be associated with a unique identifier. Such identifier is preferably an EPC code. The EPC is a simple, compact identifier that uniquely identifies objects (items, cases, pallets, locations, etc.) in the supply chain. The EPC is built around a basic hierarchical idea that can be used to express a wide variety of different, existing numbering systems, like the EAN.UCC System Keys, UID, VIN, and other numbering systems. Like many current numbering schemes used in commerce, the EPC is divided into numbers that identify the manufacturer and product type. In addition, the EPC uses an extra set of digits, a serial number, to identify unique items. A typical EPC number contains:

1. Header, which identifies the length, type, structure, version and generation of EPC;
2. Manager Number, which identifies the company or company entity;
3. Object Class, similar to a stock keeping unit or SKU; and
4. Serial Number, which is the specific instance of the Object Class being tagged.

Additional fields may also be used as part of the EPC in order to properly encode and decode information from different numbering systems into their native (human-readable) forms.

Each RFID device 102 may also store information about the item to which coupled, including but not limited to a name or type of item, serial number of the item, date of manufacture, place of manufacture, owner identification, origin and/or destination information, expiration date, composition, information relating to or assigned by governmental agencies and regulations, etc. Furthermore, data relating to an item can be stored in one or more databases linked to the RFID tag. These databases do not reside on the tag, but rather are linked to the tag through a unique identifier(s) or reference key(s).

RFID systems may use reflected or "backscattered" radio frequency (RF) waves to transmit information from the RFID device 102 to the remote device 104, e.g., reader. Since passive (Class-1 and Class-2) tags get all of their power from the reader signal, the tags are only powered when in the beam of the reader 104.

The Auto ID Center EPC-Compliant tag classes are set forth below:
Class-1
Identity tags (RF user programmable, range ~3 m)
Lowest cost
Class-2
Memory tags (20 bit address space programmable at ~3 m range)
Security & privacy protection
Low cost
Class-3
Semi-passive tags (also called semi-active tags and battery assisted passive (BAP) tags)
Battery tags (256 bits to 2M words)
Self-Powered Backscatter (internal clock, sensor interface support)
~100 meter range
Moderate cost
Class-4
Active tags
Active transmission (permits tag-speaks-first operating modes)
~30,000 meter range
Higher cost In RFID systems where passive receivers (i.e., Class-1 and Class-2 tags) are able to capture enough energy from the transmitted RF to power the device, no batteries are necessary. In systems where distance prevents powering a device in this manner, an alternative power source must be used. For these "alternate" systems (e.g., semi-active, semi-passive or battery-assisted), batteries are the most common form of power. This greatly increases read range, and the reliability of tag reads, because the tag does not need power from the reader to respond. Class-3 tags only need a 5 mV signal from the reader in comparison to the 500 mV that Class-1 and Class-2 tags typically need to operate. This 100:1 reduction in power requirement along with the reader's ability to sense a very small backscattered signal permits Class-3 tags to operate out to a free space distance of 100 meters or more compared with a Class-1 range of only about 3 meters. Note that semi-passive and active tags with built in passive mode may also operate in passive mode, using only energy captured from an incoming RF signal to operate and respond, at a shorter distance up to 3 meters.

Active, semi-passive and passive RFID tags may operate within various regions of the radio frequency spectrum. Low-frequency (30 KHz to 500 KHz) tags have low system costs and are limited to short reading ranges. Low frequency tags may be used in security access and animal identification applications for example. Ultra high-frequency (860 MHz to 960 MHz and 2.4 GHz to 2.5 GHz) tags offer increased read ranges and high reading speeds.

A basic RFID communication between an RFID device and a remote device typically begins with the remote device, e.g., reader, sending out signals via radio wave to fund a particular RFID device, e.g., tag via singulation or any other method known in the art. The radio wave hits the RFID device, and the RFID device recognizes the remote device's signal and may respond thereto. Such response may include exiting a hibernation state, sending a reply, storing data, etc.

Figure 2:
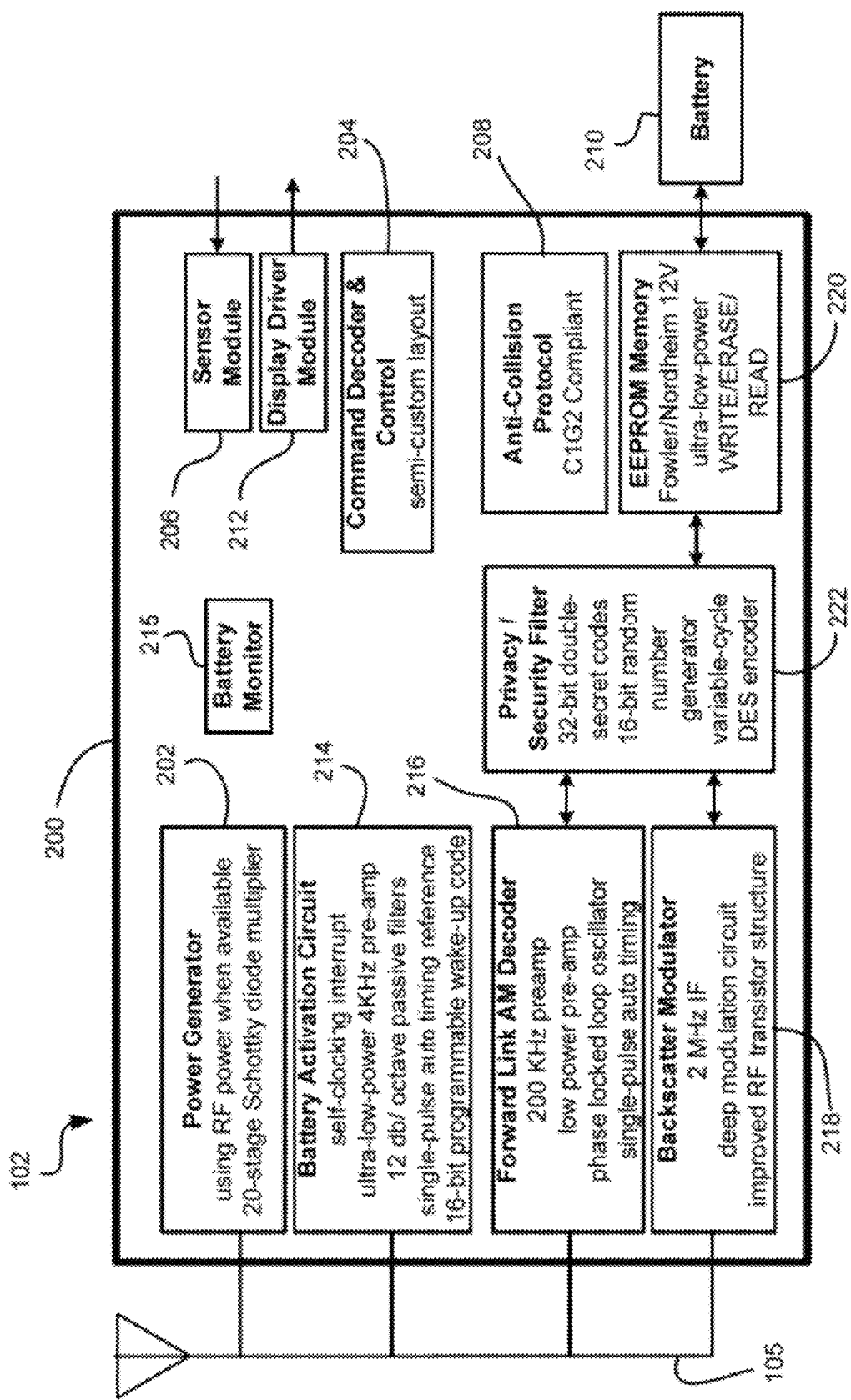
FIG. 2 is a system diagram for an integrated circuit (IC) chip for implementation in an RFID device.

Embodiments of the RFID device are preferably implemented in conjunction with a Class-3 or higher Class IC chip, which typically contains the processing and control circuitry for most if not all tag operations. FIG. 2 depicts a circuit layout of a Class-3 IC 200 and the various control circuitry according to an illustrative embodiment for implementation in an RFID tag 102. It should be kept in mind that the present invention can be implemented using any type of RFID device, and the circuit 200 is presented as only one possible implementation.

The Class-3 IC of FIG. 2 can form the core of RFID chips appropriate for many applications such as identification of pallets, cartons, containers, vehicles, or anything where a range of more than 2-3 meters is desired. As shown, the chip 200 includes several circuits including a power generation and regulation circuit. 202, a digital command decoder and control circuit 204, a sensor interface module 206, a C1G2 interface protocol circuit 208, and a power source (battery) 210. A display driver module 212 can be added to drive a display.

A forward link AM decoder 216 uses a simplified phase-lock-loop oscillator that requires only a small amount of chip area. Preferably, the circuit 216 requires only a minimum string of reference pulses.

A backscatter modulator block 218 preferably increases the backscatter modulation depth to more than 50%.

A memory cell, e.g., EEPROM, is also present, and preferably has a capacity from several kilobytes to one megabyte or more. In one embodiment, a pure, Fowler-Nordheim direct-tunneling-through-oxide mechanism 220 is present to reduce both the WRITE and ERASE currents to about 2 µA/cell in the EEPROM memory array. Unlike any RFID tags built to date, this permits reliable tag operation at maximum range even when WRITE and ERASE operations are being performed. In other embodiments, the WRITE and ERASE currents may be higher or lower, depending on the type of memory used and its requirements.

Preferably, the amount of memory available on the chip or otherwise is adequate to store data such that the external device need not be in active communication with the remote device.

The module 200 may also incorporate a security encryption circuit 222 for operating under one or more security schemes, secret handshakes with readers, etc.

The RFID device may have a dedicated power supply, e.g. battery; may draw power from a power source of the electronic device (e.g., battery, AC adapter, etc.); or both. Further, the RFID device may include a supplemental power source. Note that while the present description refers to a "supplemental" power source, the supplemental power source may indeed be the sole device that captures energy from outside the tag, be it from solar, RF, kinetic, etc. energy.

In one general embodiment, the antenna is an inverted F antenna (which is intended to include variations such as the planar inverted F antenna). The unique polarization pattern provides excellent reliability and range in highly reflective material-surrounded indoor and outdoor environments. Further, the inverted F antenna resonates within a narrower frequency band, as compared with other types of antennas, such as helices, monopoles and dipoles.

Figure 3A:
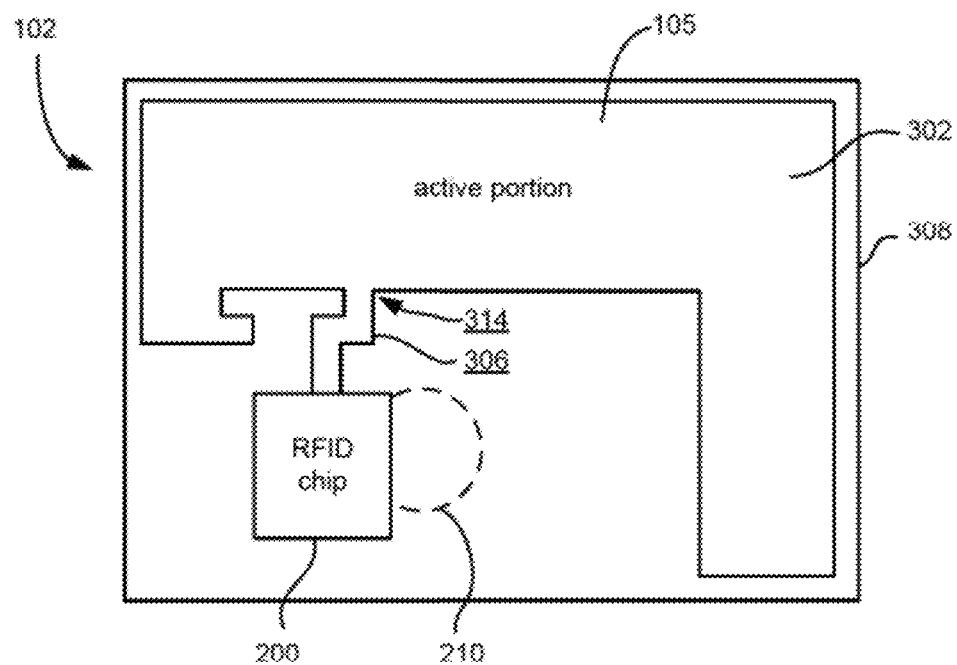
FIG. 3A is a top view of an RFID device according to one embodiment of the present invention.
Figure 3B:
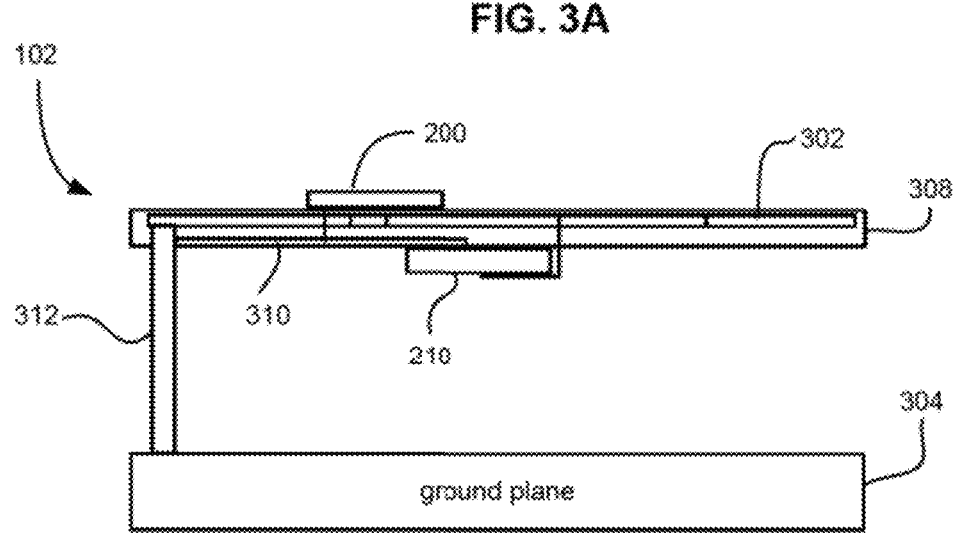
FIG. 3B is a side view of the RFID device of FIG. 3A.

FIGS. 3A and 3B depict a top-and a side view, respectively, of an illustrative RFID device 102. As shown, the RFID device 102 includes an inverted F antenna 105 having an active portion 302, a ground plane 304 spaced from the active portion 302, and a feed 306 coupled to, and coplanar with, the active portion 302. An RFID controller 200 is coupled to the feed 306. In operation, the controller 200 provides a signal to the feed, which excites the active portion 302, thereby generating an RF signal.

The active portion 302 may be formed on or in a substrate 308 such as a printed circuit board, etc. The substrate 308 may also then act as a support to other device components such as the controller 200. Further, the substrate 308 may support or contain the various circuitry and connections needed for proper operation of the device.

In this embodiment, the active portion 302 and ground plane 304 lie on parallel planes. In other embodiments, the planes on which the active portion 302 and ground plane 304 lie might intersect. While any dielectric material can be interposed between the active portion 302 and the ground plane 304, e.g., plastic, Styrofoam, etc., the preferred material is air. An air dielectric is best from an energy efficiency standpoint, with the antenna size being about a quarter of wavelength at the center of the operating frequency band. Other dielectrics can shorten the antenna, but may result in lower efficiency and narrower bandwidths.

The active portion 302 may be of standard construction known in the art. Typical materials that may be used to construct the active portion 302 are copper, gold, silver; etc. In general, the overall length of the inverted F antenna (height plus length) is approximately one-quarter wavelength at the resonant frequency. Adjustment of the width of the active portion 302 and/or the conductive member 312 affects the bandwidth of the inverted F antenna, with bandwidth increasing as the width(s) is/are increased.

The ground plane 304 may be of a standard construction known in the art. In one approach, the ground plane 304 is formed of a continuous sheet of metal formed in or on a suitable substrate 308, such as a printed circuit board, etc. Preferably, the ground plane 304 has similar extents in directions parallel to its plane as the active portion 302, which makes it possible to achieve small form factors without compromising antenna performance. In particularly preferred embodiments, the substrate 308 extends to, or slightly beyond, outer edges of the active portion 302 (as shown in FIG. 3A), while the ground plane 304 has similar dimensions as the substrate 308 (as shown in FIG. 3B). In other approaches, the ground plane extends beyond, and sometimes even significantly beyond, the extents as the active portion 302. Though the ground plane may have larger dimensions, the antenna functions in substantially the same manner. Note that these dimensions refer primarily to length and width, not thickness in a direction perpendicular to the overall plane thereof.

A preferably vertical conductive member 312 provides an electrical bridge between the active portion 302 and the ground plane 304. In one embodiment, the conductive member 312 has a height that is a small fraction of the wavelength (e.g., 2-4%) and is coupled to the active portion 302 along one side thereof. The inverted F antenna thus presents a low profile, resulting in a compact transponder module. The feedpoint 314 is displaced from the conductive member 312 by a predetermined distance. Adjustment of the location of the feedpoint 314 relative to the conductive member 312 and the active portion 302 allows the inverted F antenna to be tuned or partially tuned. That is, the antenna is tapped at a distance from the base to provide a desired driving point impedance. Thus, any impedance level may be obtained by adjusting various parameters of the tap position and geometry. As discussed below, this may be important for matching the impedance of the controller 200.

As noted above, the feed 306 is coplanar to the active portion 302. Preferably the feed 306 is coplanar to the active portion 302 for a full extent of the feed 306, i.e., from the coupling to the antenna portion to the lead connecting the feed 306 to the controller 200.

In one approach, the coplanar feed 306 is of continuous construction with the active portion 302. For example, the feed 306 may be formed concurrently with the active portion 302. The feed 306 may even be of the same material as the active portion 302. In other embodiments, the feed 306 may be formed in a different processing step than formation of the active portion 302.

In embodiments where the RFID device is an active or semi-active device, a battery 210 or other power source may be coupled to the controller 200. In the embodiment shown, the battery is positioned on a plane located between the active portion 302 and the ground plane 304, though other positions are contemplated. The substrate 308 may include a ground portion 310 for coupling to a terminal of a battery, e.g., via direct engagement thereof. As shown in FIG. 3B, the ground portion 310 is preferably in electrical communication with the ground plane 304. One way to do this is to couple the ground portion 310 to the conductive member 312 via a printed trace, a conductor, etc. Another way is to design the ground portion 310 to extend to the conductive member 312. Circuitry in the substrate 308, a conductive lead or via, connects the ground portion 310 to the controller 200. Another lead may connect the other battery terminal to the controller 200. It should also be pointed out that the ground portion 310 can also serve any RF grounding needs.

One terminal of the battery, e.g., the negative terminal, may be in direct electrical communication with the antenna ground plane 304. For instance, in embodiments having a ground portion 310 on the substrate 308, the ground portion 310 may connect to the conductive member 312 coupling the active portion 302 to the ground plane 304. In other embodiments, a simple lead may be used.

The design of the inverted F antenna is not narrowly critical. In one approach, the antenna may be designed to match an impedance of the controller 200. Particularly, the antenna may be matched to an arbitrary impedance, e.g., the impedance of an RFID chip to be used with the antenna. The required impedance bandwidth may be achieved by adjusting variables, such as the feedpoint 314, the width of the conductive member 312 that connects the active portion 302 to the ground plane 304, the shape and/or dimensions of the active portion 302, etc. Computer modeling of antenna designs based on the teachings presented herein may be used to assist in selection of the feed 306 position, width of the conductive member 312, and other variables for a particular implementation.

In another approach, the antenna may be designed to an impedance of general use, e.g., 50 ohms.

In embodiments that include a battery, the design should take into account the effects of the battery on antenna performance. Again, computer modeling may be used to facilitate design.

In one embodiment designed to be operated at a frequency of 915 MHz, the spacing between the active portion 302 and the ground plane 304 is about 8 mm, the width of the active portion 302 is about 12 mm in the wide portion and about 8 mm in the narrow portion, and the length of the active portion 302 is about 84 mm.

Figure 4A:
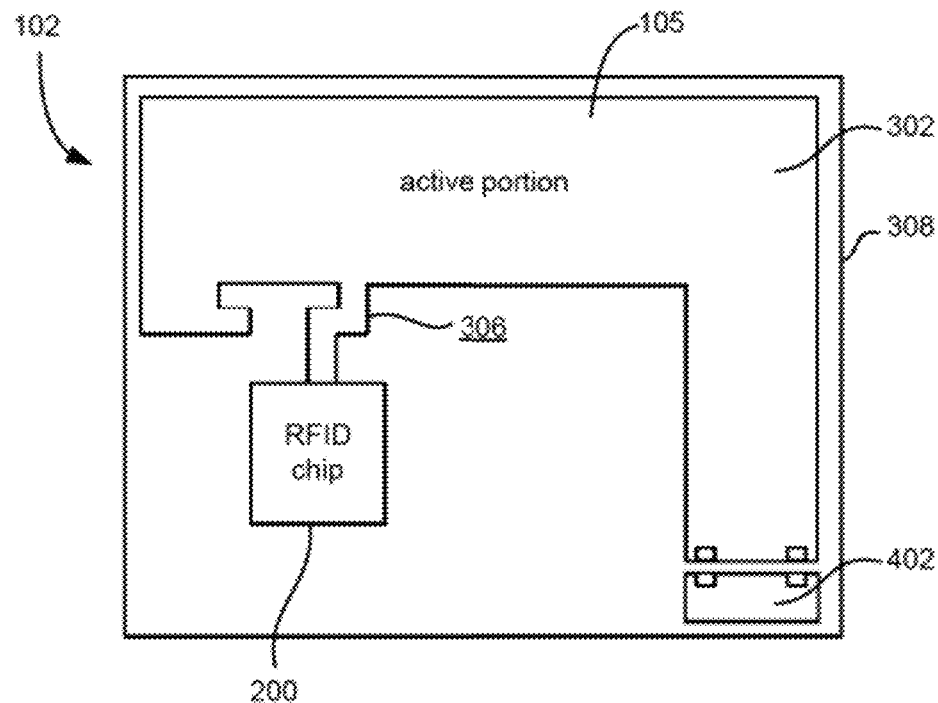
FIG. 4A is a top view of an RFID device according to one embodiment of the present invention.

FIG. 4A illustrates an embodiment which includes an extension portion 402 that is selectively coupleable to the active portion 302 for altering a resonant frequency of the inverted F antenna, and thus the frequency of the emitted signal. The ability to select the antenna length is useful, for instance where it is desirable to create a tag that may be ultimately used in one of two different regulatory environments, e.g., United States or Europe.

In one approach, the extension portion 402 is formed concurrently with the active portion 302, yet electrically isolated therefrom. If the tag is to be used in a regulatory environment where the length of the active portion 302 is appropriate, no connection is made. If the tag is to be used in a regulatory environment where the length of the active portion 302 is insufficient, the extension portion 402 can be simply coupled thereto by any suitable mechanism, e.g., a zero-ohm resistor, solder, wire, etc. Accordingly, a single antenna need be manufactured for multiple regulatory environments, greatly reducing costs by eliminating the need to separately design and fabricate a different antenna (or portion thereof) for each regulatory environment.

Figure 4B:
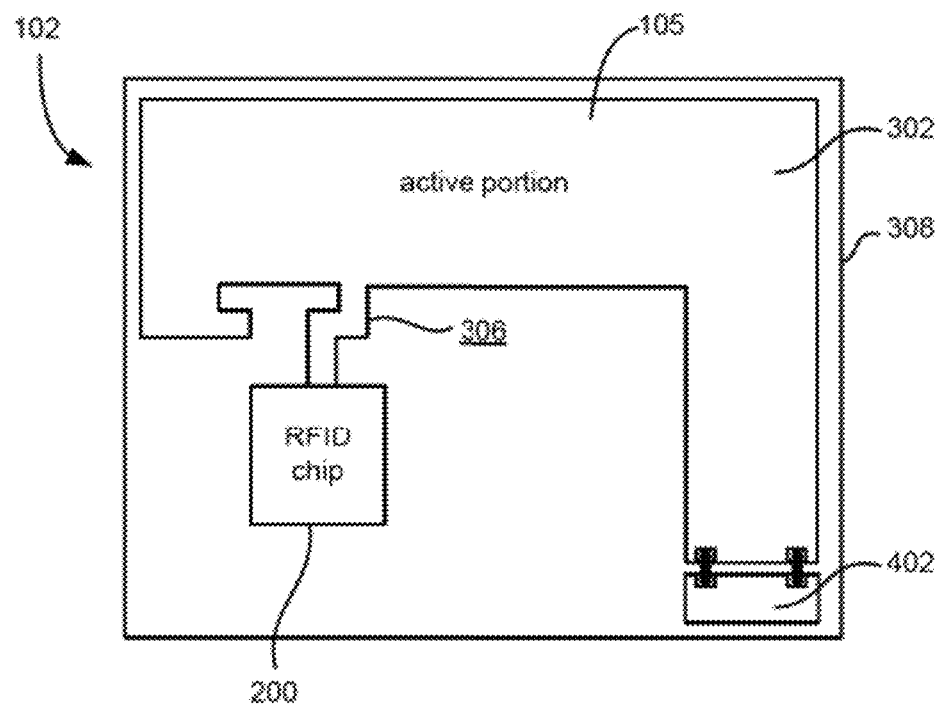
FIG. 4B is a top view of the RFID device of FIG. 4A with the extension portion coupled to the active portion.

In FIG. 4A, the extension portion 402 is not coupled to the active portion 302. In FIG. 4B, the extension portion 402 is coupled to the active portion 302.

Inverted F antennas constructed according to the teachings presented herein provide excellent performance when mounted on or near an electrically conductive surface and/or RF reflective surface, not just on or near nonconductive or nonreflective surfaces. In various embodiments, such an antenna will perform equally or better when positioned on or near a conductive and/or reflective surface than when positioned on or near a nonconductive and/or nonreflective surface.

While the foregoing embodiments provide excellent performance, the following embodiments provide enhanced performance. In various approaches, two or more inverted F antennas are provided, which provides a better radiation pattern as well as improved sensitivity. The antennas may have nearly identical components such as the active portions, may share a component such as the ground plane, etc.

In other embodiments, the active portion of an inverted F antenna is modified to provide a dual frequency operation, which enables operation across a much wider bandwidth.

Figure 5:
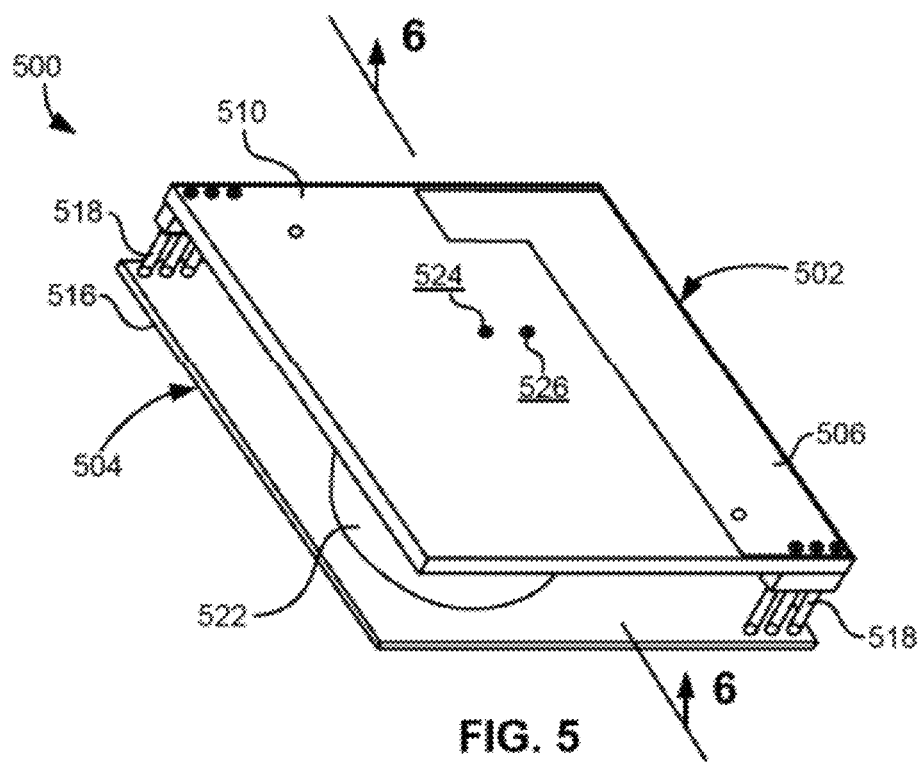
FIG. 5 is a perspective view of an RFID device according to one embodiment.
Figure 6:
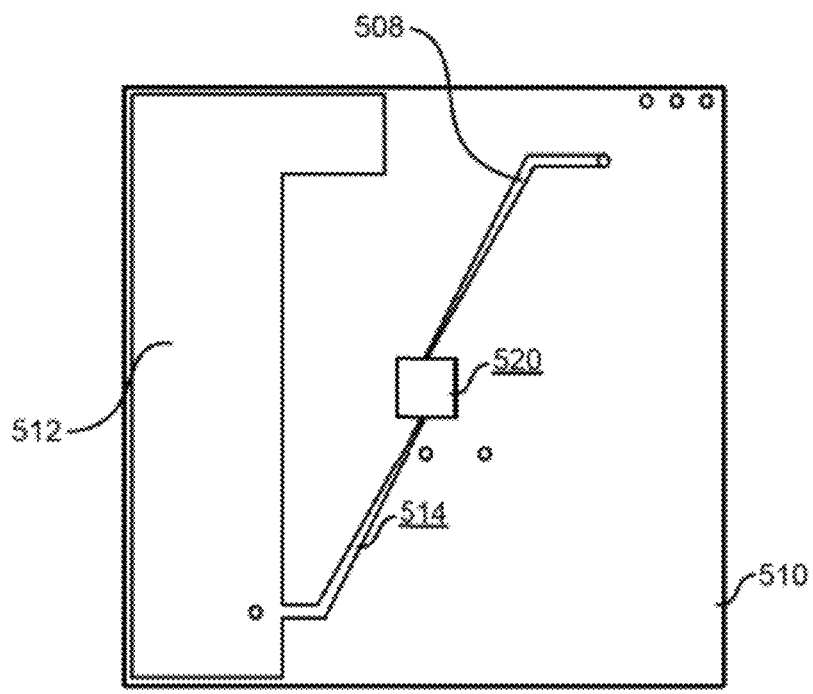
FIG. 6 is a partial view of the RFID device of FIG. 5 taken along line 6-6 of FIG. 5.

FIGS. 5 and 6 depict another embodiment of an RFID device 500 having first and second inverted F antennas 502, 504. As an option, the present device 500 may be implemented in conjunction with features from any other embodiment listed herein, such as those described with reference to the other FIGS. Of course, however, such device 500 and others presented herein may be used in various applications and/or in permutations which may or may not be specifically described in the illustrative embodiments listed herein. Further, the device 500 presented herein may be used in any desired environment.

With continued reference to FIG. 5, an active portion 506 of the first inverted F antenna 502 and a feed 508 electrically coupled to the active portion extend along a substrate 510. The substrate preferably includes at least one dielectric layer, and may include polytetrafluoroethylene, FR-4, FR-1, CEM-1, CEM-3, etc. In a preferred approach, the substrate has a dielectric constant between about 3.5 and about 4. An active portion 512 of the second inverted F antenna 504 is shown extending along an underside of the substrate 510. Thus, the active portion 506 of the first inverted F antenna and the active portion 512 of the second inverted F antenna lie along parallel but spaced apart planes in the embodiment shown. This separation minimizes the coupling effect between the antennas. In a variation, the active portion 512 of the second inverted F antenna 504 may be on the same side of the substrate 510 as active portion 506. Moreover, as shown in FIGS. 5 and 6, the active portions 506, 512 may be on the same side of the ground plane 516.

In another approach, the active portions 506, 512 may be on opposite sides of the ground plane 516, such that the active portions sandwich the ground plane therebetween.

Preferably, the active portion 506 of the first inverted F antenna is electrically isolated from the active portion 512 of the second inverted F antenna by a dielectric material, such as the substrate 510.

A feed 514 is electrically coupled to the active portion 512 of the second inverted F antenna, and may be positioned on either side of the substrate 510. A ground plane 516 is spaced from the active portions. Note that the first and second inverted F antennas may use the same ground plane. Thus, the first and second inverted F antennas may each be conceptually considered to be a separate inverted F antenna, though the ground plane is shared.

One or more conductive members 518 may be used to electrically couple each of the active portions 506, 512 to the ground plane 516. Generally, multiple pins and/or a wide member are preferred. Ideally, the conductive member(s) couple as much of the end of the active portion as possible to the ground plane.

An RFID controller 520 is coupled to the feeds 508, 514. One or more of the inverted F antennas may be designed to match an impedance of the controller. In other approaches, an interposer or other device may be used to create impedance matching, if desired.

The relative orientations of the components of the inverted F antennas 502, 504 may be arranged according to the constraints of the particular design, as would be understood by one skilled in the art upon reading the present disclosure. For example, assume that the RFID controller 520, in one approach, has a 180 degree phase shift between differential inputs/outputs coupled to the feeds 508, 514. In such case, the profile of the active portion, 512 of the second inverted F antenna 504 is arranged in an opposite orientation relative to the orientation of the first active portion 506, i.e., is rotated 180 degrees relative thereto, as shown in FIGS. 5 and 6. Thus, the inverted F antennas are specially arranged 180 degrees out of phase, and the two antenna feeds are connected to the controller 520 as differential inputs/outputs. During transmission, the radiations created by the antennas are additive, and do not cancel each other. Thus, improved transmission is achieved. Similarly, the incoming signal is also received differentially by such design, which results in improved sensitivity.

In some embodiments, a battery 522 may be coupled to the controller. The battery 522 is preferably positioned between the substrate 510 and the ground plane 516, but could be above the substrate or below the ground plane in various approaches. Ideally, the battery 522 is mounted on the ground plane 516 to increase the spacing between the battery and the active portions, because the battery tends to act as a ground plane. In one preferred embodiment, one terminal of the battery is in direct electrical communication with the ground plane. For example, the terminal may rest on the ground plane, be soldered to the ground plane, be coupled by an electrically conductive adhesive to the ground plane, etc. In another approach, conductive members may couple the battery to the ground plane.

Conductors 524, 526 may be used to couple the RFID controller 520 to the battery 522.

The embodiment shown in FIGS. 5 and 6 was found to improve the main lobe performance by about 6 dB. This design improved the e-field distribution in the elevation plane and hence contributed to about a 3 dB improvement in the antenna efficiency in an edge-on orientation. Moreover, because the antennas are driven differentially in this design, an additional about 3 dB improvement to the overall sensitivity was also provided. This improvement in signal results in improved range and more uniformity in terms of radiation pattern.

Figure 10:
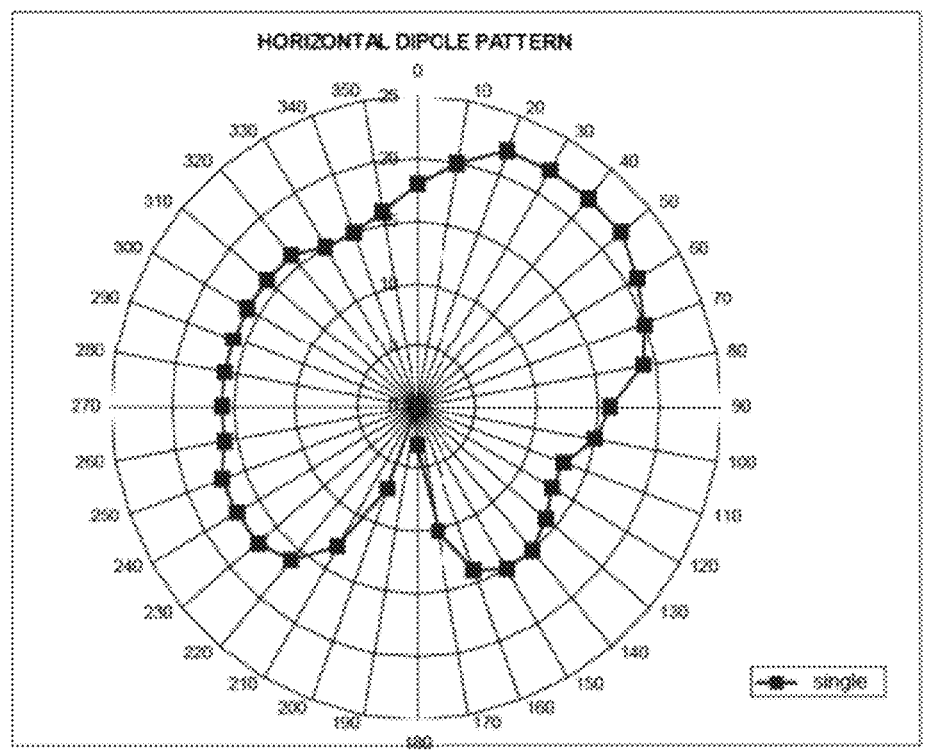
FIG. 10 is a chart depicting a horizontal dipole pattern of a single inverted F antenna in an exemplary embodiment.
Figure 11:
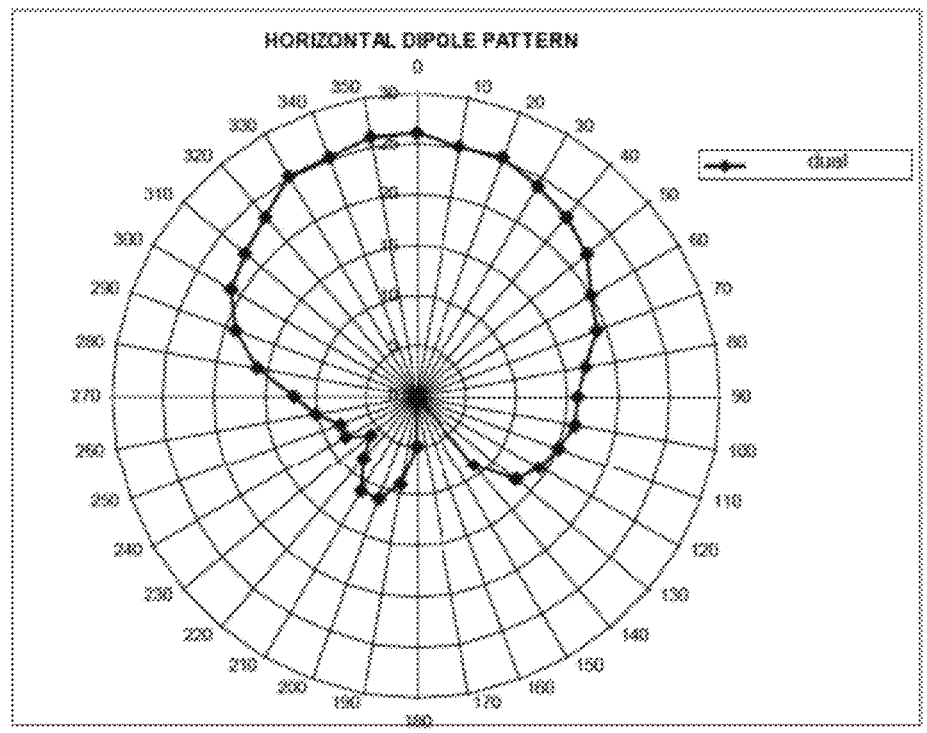
FIG. 11 is a chart depicting a horizontal dipole pattern of a dual inverted F antenna arrangement according to one exemplary embodiment.

By way of example, FIG. 10 depicts a horizontal dipole pattern of a single inverted F antenna in an exemplary embodiment, while FIG. 11 depicts a horizontal dipole pattern of a dual inverted F antenna arrangement according to one exemplary embodiment. The circles are in dB, while the radial coordinates represent orientation from a face-on orientation at 0. The frequency is in the US band. As shown in FIG. 10, there is a large null at an orientation of 180 (directly behind the ground plane). Moreover, the pattern is nonuniform, with a protrusion extending towards the top-right of the chart. In contrast, as shown in FIG. 11, which has a different scale than. FIG. 10, the pattern is much more uniform. Moreover, the null is shifted.

Various embodiments presented herein may be adapted to work well with multiple frequencies and/or across a wider frequency range. For example, in one embodiment, a length of the active portion of the first inverted F antenna is different than a length of the active portion of the second inverted F antenna such that each inverted F antenna is tuned to have a maximum effectiveness or "peak" at a different frequency. Thus, in a variation on the embodiment of FIGS. 5 and 6, active portion 506 may be longer than active portion 512, e.g., by extending the free end of active portion 506.

In another approach, an extension portion, e.g., similar to that shown in FIGS. 4A-4B, that is selectively coupleable to one or more of the active Portions 506 and/or 512 for altering the resonant frequency of the associated inverted F antenna.

Figure 7:
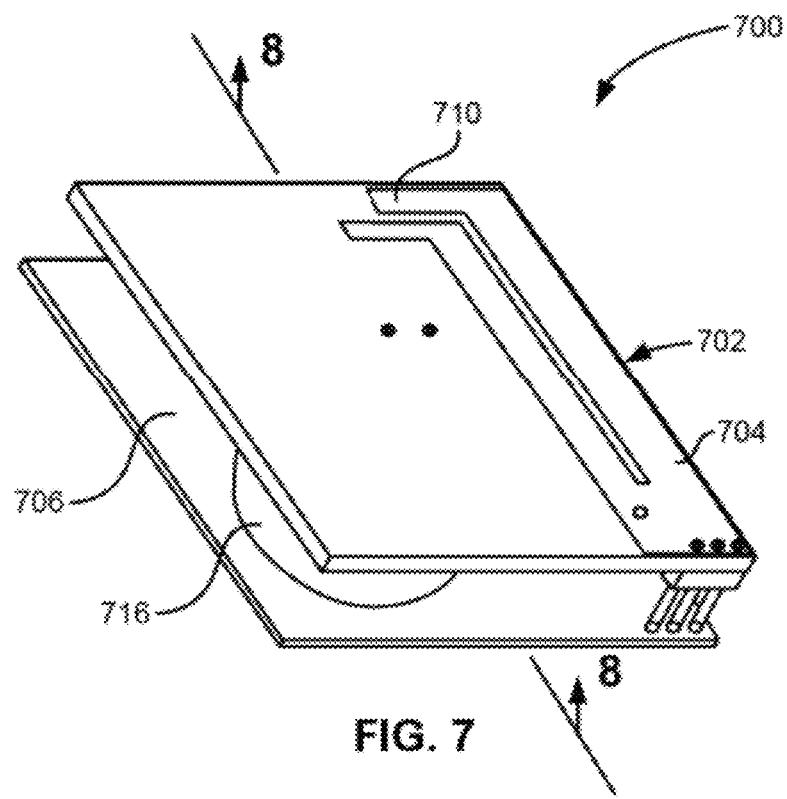
FIG. 7 is a perspective view of an RFID device according to one embodiment.
Figure 8:
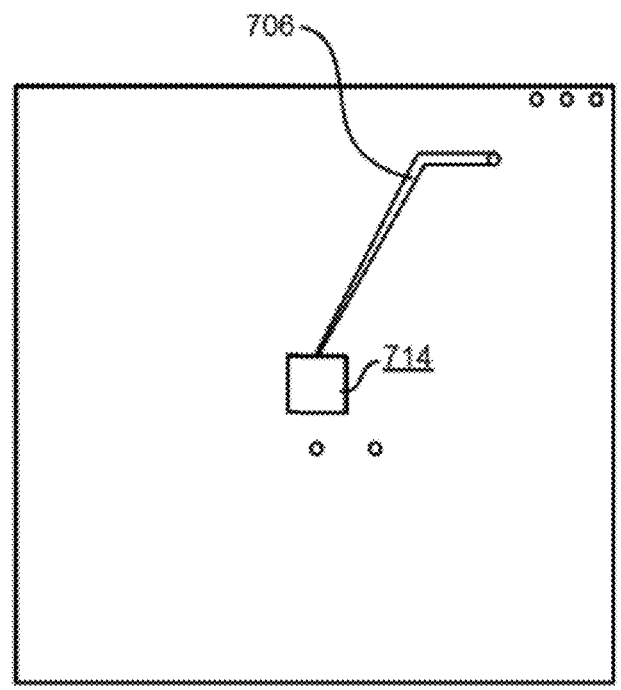
FIG. 8 is a partial view of the RFID device of FIG. 5 taken along line 6-6 of FIG. 5.

FIGS. 7 and 8 illustrate an RFID device 700 according to another embodiment. As an option, the present device 700 may be implemented in conjunction with features from any other embodiment listed herein, such as those described with reference to the other FIGS. Of course, however, such device 700 and others presented herein may be used in various applications and/or in permutations which may or may not be specifically described in the illustrative embodiments listed herein. Further, the device 700 presented herein may be used in any desired environment.

With continued reference to FIGS. 7 and 8, the RFID device 700 includes an inverted F antenna 702 having an active portion 704, a ground plane 706 spaced from the active portion 704, and a feed 706 coupled to the active portion. An RFID controller 714 may be coupled to the feed 706.

The active portion 704 includes multiple arms 710, 712, a first 710 of the arms having a first length and a second 712 of the arms having a second length. Each arm resonates at a different frequency, such that the inverted F antenna is tuned to two different frequencies. The length of the particular arm determines over which frequency range it resonates. Typically, a peak representing the strongest signal is found within the range.

For example, one arm may be tuned to resonate at about 900 MHz (e.g., 902-928 MHz which includes frequencies in the US band), while the other arm may be tuned to resonate at about 860 MHz (e.g., 865-867 MHz, which includes frequencies in the European band). This allows the device 700 to operate in both the US and European regions. Moreover, while there is a dip between the peaks, it is small. Thus, the antenna 702 is functional over a wider frequency range, e.g., 865 to 928 MHz, than would be achieved with an active portion having no arms.

Note that only a single feed is needed, though more could be provided. Moreover, no special tuning components are needed, though some could be provided.

In some embodiments, a battery 716 may be coupled to the controller 714. The battery positioning and/or coupling configuration may be as presented elsewhere herein.

In one approach, an extension portion, e.g., similar to that shown in FIGS. 4A-4B, may be selectively coupleable to one of the arms of the active portion of the inverted F antenna for altering a wavelength of the inverted F antenna.

In further approaches, the active portion may have more than two arm, e.g., 3, 4, 5, 6, etc.

Figure 9:
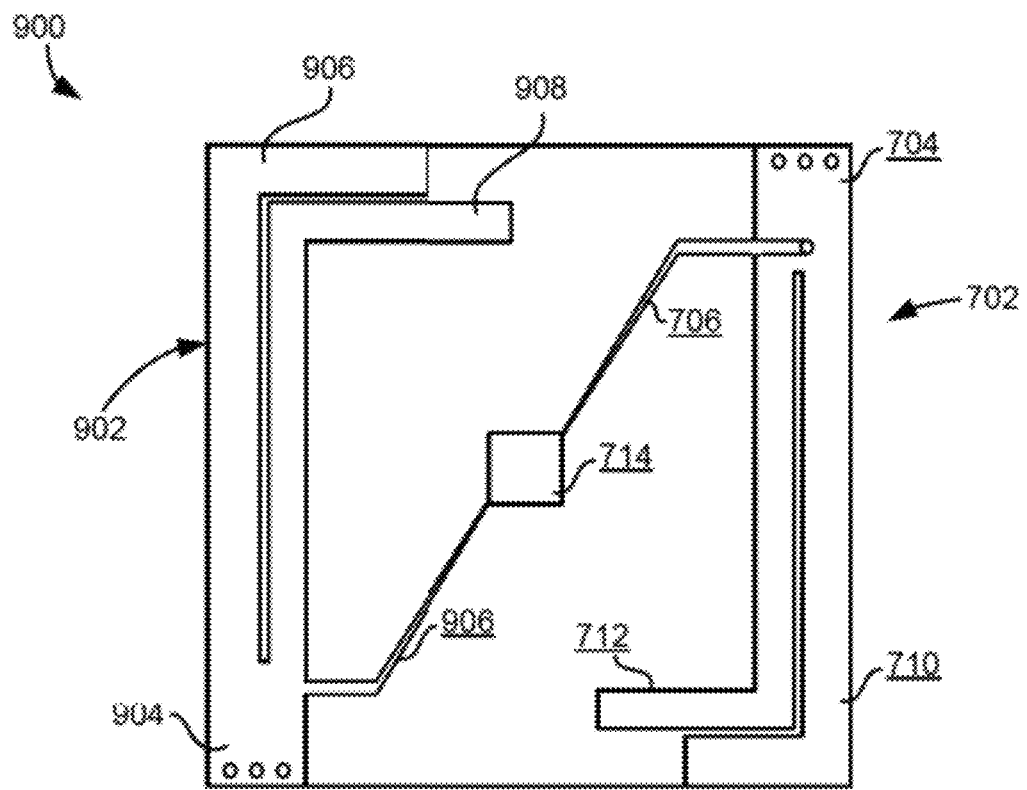
FIG. 9 is a graphical representation of an RFID device according to one embodiment.

FIG. 9 illustrates an RFID device 900 according to another embodiment. As an option, the present device 900 may be implemented in conjunction with features from any other embodiment listed herein, such as those described with reference to the other FIGS. Of course, however, such device 900 and others presented herein may be used in various applications and/or in permutations which may or may not be specifically described in the illustrative embodiments listed herein. Further, the device 900 presented herein may be used in any desired environment.

With continued reference to FIG. 9, the RFID device 900 includes similar components as described above with reference to FIGS. 7 and 8. The device 900 also includes an active portion 904 of a second inverted F antenna 902. The active portion is spaced from the ground plane. A feed 906 of the second inverted F antenna couples the active portion 904 of the second inverted F antenna. 902 to the RFID controller 714. The active portion 904 of the second inverted F antenna 902 includes multiple arms 906, 908 having different lengths.

In one embodiment, the lengths of the first and second arms 906, 908 of the active portion 904 of the second inverted F antenna 902 are the same as the first and second lengths of the first and second arms 710, 712 of the active portion 704 of inverted F antenna 702.

While FIG. 9 exemplifies that the active portions 704, 904 of the inverted F antennas 702, 902 may lie in the same plane, other approaches may have the active portions lie along parallel but spaced apart planes, e.g., in a similar manner to that shown in FIGS. 5-6. Preferably, the active portions are electrically isolated from one another by a dielectric material.

Figure 12:
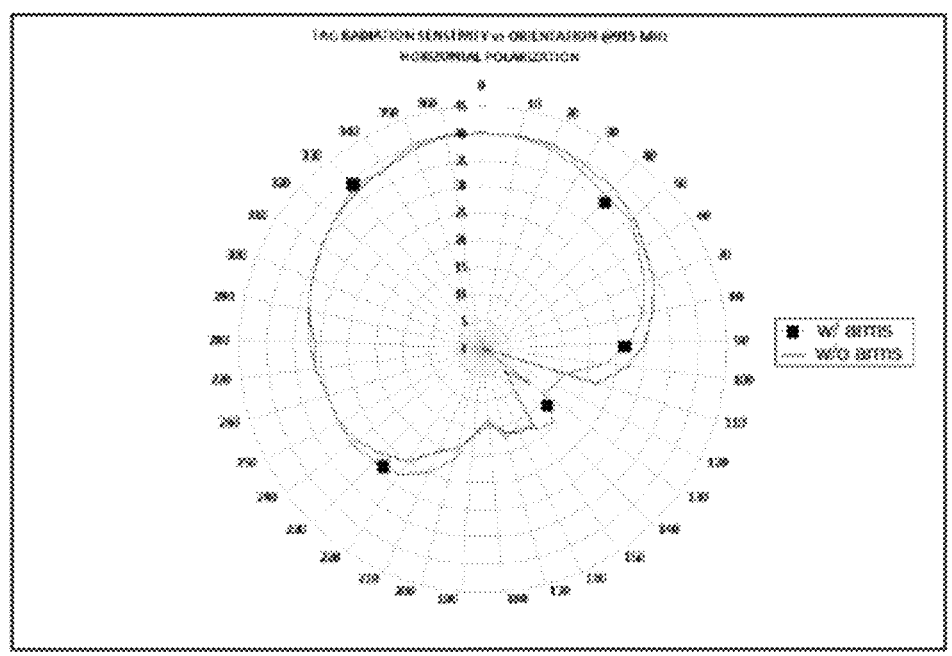
FIG. 12 is a chart depicting two radiation patterns, one for a device having a dual inverted F antenna configuration without arms, and the other pattern for a device having dual inverted F antenna configuration with arms.

It was surprisingly found that the dual-inverted F antenna, dual-arm embodiment as described above eliminates the null typically seen at some orientation relative to the device. Referring to FIG. 12, there are shown two radiation patterns, one for a device having a dual inverted F antenna configuration without arms and tuned to the US frequency band, and the other pattern for a device having dual inverted F antenna configuration with arms according to one embodiment. This elimination of the null was not expected, nor predictable, and is considered an extremely surprising and beneficial discovery.

In another embodiment, the lengths of the first and second arms 906, 908 of the active portion 904 of the second inverted F antenna 902 are different than the first and second lengths of the first and second arms 710, 712 of the active portion 704 of inverted F antenna 702.

In one embodiment, the active portions 704, 904 may be on the same side of the ground plane. In another approach, the active portions 704, 904 may be on opposite sides of the ground plane, such that the active portions sandwich the ground plane therebetween.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An RFID device, comprising:
   a substrate;
   a first active portion of a first inverted F antenna extending along a topside of the substrate;
   a first feed electrically coupled to the first active portion;
   a second active portion of a second inverted F antenna extending along an underside of the substrate such that the first active portion of the first inverted F antenna and the second active portion of the second inverted F antenna lie along parallel but spaced apart planes, wherein the second active portion of the second inverted F antenna is arranged in an opposite orientation relative to an orientation of the first active portion of the first inverted F antenna, such that the second active portion is rotated about 180 degrees from the orientation of the first active portion relative to a central axis perpendicular to a face of the substrate;
   a second feed electrically coupled to the second active portion;
   a ground plane spaced from the active portions;
   an RFID controller coupled to the feeds; and
   a battery coupled to the RFID controller, wherein the battery is positioned between the active portions of the inverted F antennas and the ground plane, such that the active portions of the inverted F antennas are on a first side of the battery and the ground plane is on a second side of the battery that is opposite of the first side.

2. The RFID device as recited in claim 1, wherein one terminal of the battery is in direct electrical communication with the ground plane.

3. The RFID device as recited in claim 1, wherein the first active portion of the first inverted F antenna is electrically isolated from the second active portion of the second inverted F antenna by a dielectric material.

4. The RFID device as recited in claim 1, wherein a length of the first active portion of the first inverted F antenna is different than a length of the second active portion of the second inverted F antenna such that each inverted F antenna is tuned to a different frequency.

5. The RFID device as recited in claim 1, further comprising an extension portion being selectively coupleable to the first active portion of the first inverted F antenna for altering a resonant frequency of the first inverted F antenna.

6. The RFID device as recited in claim 1, wherein the active portions are on a same side of the ground plane.

7. The RFID device as recited in claim 1, wherein one or more of the first inverted F antenna and the second inverted F antenna is designed to match an impedance of the RFID controller.

* * * * *